US010374670B2

(12) United States Patent
Bethanabhotla et al.

(10) Patent No.: US 10,374,670 B2
(45) Date of Patent: Aug. 6, 2019

(54) PORT-TO-BEAM PRECODING TO ENABLE CODEBOOK BASED MU-MIMO OPERATION IN ACTIVE ANTENNA SYSTEMS

(71) Applicant: Blue Danube Systems, Inc., Warren, NJ (US)

(72) Inventors: Dilip Bethanabhotla, Sunnyvale, CA (US); Chris Tsun Kit Ng, Somerset, NJ (US); Mihai Banu, New Providence, NJ (US)

(73) Assignee: Blue Danube Systems, Inc., Warren, NJ (US)

( * ) Notice: Subject to any disclaimer, the term of this patent is extended or adjusted under 35 U.S.C. 154(b) by 0 days.

(21) Appl. No.: 16/128,864

(22) Filed: Sep. 12, 2018

(65) Prior Publication Data

US 2019/0089428 A1    Mar. 21, 2019

Related U.S. Application Data

(60) Provisional application No. 62/558,971, filed on Sep. 15, 2017.

(51) Int. Cl.
*H04B 7/0452* (2017.01)
*H04B 7/0456* (2017.01)

(52) U.S. Cl.
CPC ......... *H04B 7/0456* (2013.01); *H04B 7/0452* (2013.01)

(58) Field of Classification Search
CPC .. H04B 7/0617; H04B 7/0452; H04B 7/0478; H04B 7/0891
USPC .................................. 375/267, 299, 347, 349
See application file for complete search history.

(56) References Cited

U.S. PATENT DOCUMENTS

| | | | | |
|---|---|---|---|---|
| 2009/0117862 | A1* | 5/2009 | Le Nir | H04B 7/0697 455/101 |
| 2010/0172430 | A1* | 7/2010 | Melzer | H04B 7/0417 375/267 |
| 2010/0315970 | A1* | 12/2010 | Ramamurthi | H04B 7/0619 370/252 |
| 2013/0005282 | A1* | 1/2013 | Zhang | H04L 27/2634 455/114.2 |

(Continued)

OTHER PUBLICATIONS

International Search Report and Written Opinion, dated Dec. 3, 2018 (18 pages).

*Primary Examiner* — Emmanuel Bayard
(74) *Attorney, Agent, or Firm* — Occhiuti & Rohlicek LLP

(57) ABSTRACT

A method for communicating with a plurality of communication devices (UEs) using a phased array antenna system including an array of antenna elements, the method involving: receiving a plurality of port signal streams, wherein the plurality of port signal streams was obtained by precoding a plurality of data streams, each data stream of the plurality of data streams intended for a different corresponding UE; and within the phased array antenna system, processing the plurality of port signal streams to (1) undo the precoding that was performed on the plurality of data streams, and (2) generate via the array of antenna elements a plurality of transmit beams, wherein each transmit beam is directed towards a corresponding different UE among the plurality of UEs and carries a corresponding transmit signal that is derived exclusively from the data stream among the plurality of data streams that is intended for that UE.

13 Claims, 12 Drawing Sheets

(56) References Cited

U.S. PATENT DOCUMENTS

| | | |
|---|---|---|
| 2013/0202054 A1 | 8/2013 | Khan et al. |
| 2015/0124688 A1 | 5/2015 | Xu et al. |
| 2015/0358132 A1* | 12/2015 | Wallen .................. H04L 5/0023 370/329 |
| 2016/0337017 A1 | 11/2016 | Moon et al. |
| 2017/0099658 A1* | 4/2017 | Shattil .................. H04L 63/061 |
| 2017/0257155 A1 | 9/2017 | Liang et al. |
| 2019/0007112 A1* | 1/2019 | Faxer .................. H04B 7/0456 |

\* cited by examiner

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ ← $S_1$ | — |

Fig. 1

| Codebook index | $u_n$ | Number of layers $v$ | | | |
|---|---|---|---|---|---|
| | | 1 | 2 | 3 | 4 |
| 0 | $u_0 = [1 \ -1 \ -1 \ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1 \ -j \ 1 \ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1 \ 1 \ -1 \ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1 \ j \ 1 \ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1 \ (-1-j)/\sqrt{2} \ -j \ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1 \ (1-j)/\sqrt{2} \ j \ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1 \ (1+j)/\sqrt{2} \ -j \ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1 \ (-1+j)/\sqrt{2} \ j \ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1 \ -1 \ 1 \ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1 \ -j \ -1 \ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1 \ 1 \ 1 \ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1 \ j \ -1 \ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1 \ -1 \ -1 \ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1 \ -1 \ 1 \ -1]^T$ | $W_{13}^{(1)}$ | $W_{13}^{(13)}/\sqrt{2}$ | $W_{13}^{(134)}/\sqrt{3}$ | $W_{13}^{(1324)}/2$ |
| 14 | $u_{14} = [1 \ 1 \ -1 \ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1 \ 1 \ 1 \ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

PORT-TO-BEAM PRECODING TO ENABLE CODEBOOK BASED MU-MIMO OPERATION IN ACTIVE ANTENNA SYSTEMS

CROSS-REFERENCE TO RELATED APPLICATION

This application claims the benefit of U.S. Provisional Application No. 62/558,971, filed Sep. 15, 2017, all of which is incorporated herein by reference.

TECHNICAL FIELD

The embodiments described herein are directed to wireless communication systems and more particularly to enabling spatial multiplexing/Multiuser-Multiple Input Multiple Output (MU-MIMO) of data streams to multiple user equipment (UE) terminals in active antenna systems (AAS) using existing codebook-based feedback designs.

BACKGROUND

A communication system includes a Downlink that conveys signals from transmission points such as Base Stations (BSs) to User Equipment (UEs) and an Uplink that conveys signals from UEs to BSs.

When an active antenna array, or active antenna system (AAS), is used in cellular wireless communications, the AAS can shape or focus radio frequency (RF) energy in the downlink, and receive sensitivity in the uplink, by adjusting the magnitudes and the phase shifts of the transmit and receive signals at its plurality of antenna elements. In cellular systems, downlink refers to the transmit (TX) operation of the AAS, and uplink refers to receive (RX) operation.

Existing codebook designs for UE feedback are not suitable for operation with active antenna systems capable of producing narrow beams. In addition, such codebooks have been designed keeping in mind point-to-point MIMO (also known as single-user MIMO (SU-MIMO)) with very limited support for the possibility of transmitting to multiple UEs at the same time known as Multi-User MIMO. One object of the concepts described herein is to enable MU-MIMO transmission to UEs with active antenna systems using the existing codebook designs.

SUMMARY

The present disclosure provides a method and apparatus for precoding/combining signals for use in advanced communication systems. The problems with codebook based MU-MIMO performance in wide beam passive antenna systems are circumvented in accordance with various embodiments described herein. The concept described herein can be flexibly applied either at the baseband unit (BBU) or at the active antenna system remote radio head (AAS RRH) depending on the convenience of implementation for the system engineer.

In a first embodiment, a method includes transmitting, by a base station via an antenna array, a plurality of signals to multiple UEs at the same time. The method also includes applying a precoding to the plurality of signals prior to transmission. The precoder is designed by taking appropriate linear combinations of the signals. The method precodes antenna ports onto beams (TXRUs) to enable codebook based MU-MIMO operation with active antenna systems. An AAS RRH can generate orthogonal beams pointed in different spatial directions in a software re-configurable manner and this capability is exploited in the embodiments described herein. With beams sufficiently narrow and pointing in mutually orthogonal directions, it is possible to spatially multiplex several users, one inside each beam with minimal interference using the existing and widely deployed codebook based closed-loop transmission modes (such as Transmission Modes 4 and 5 in LTE). The method for 'port-to-beam' precoding insures that each UE in each beam feeds hack the same PMI constantly to the BBU. In addition, the method for 'port-to-beam' precoding cancels or undoes the effect of the 'layer-to-port' precoder chosen by the BBU in response to the constant PMIs fed back by the UEs and separates data layers intended for different UEs along different beams, one layer in each beam.

In a second embodiment, an apparatus is provided for flexible implementation of the port-to-beam precoding. The matrix operation involving linear combinations of modulation symbols from the antenna ports can be implemented either as a separate digital module inside the RRH or can be equivalently implemented in the analog domain by setting the transmit beam coefficients to reflect such linear combinations.

A third embodiment of the disclosure relates to an apparatus for mapping arbitrary complex linear combinations of the antenna port signals to given spatial directions of an active antenna array system.

In general, in one aspect, the invention features a method for communicating with a plurality of communication devices (UEs) using a phased array antenna system including an array of antenna elements. The method involves: receiving a plurality of port signal streams, wherein the plurality of port signal streams was obtained by precoding a plurality of data streams, each data stream of the plurality of data streams intended for a different corresponding UE among the plurality of UEs; and within the phased array antenna system, processing the plurality of port signal streams to (1) undo the precoding that was performed on the plurality of data streams, and (2) generate via the array of antenna elements a plurality of transmit beams, wherein each transmit beam is directed towards a corresponding different UE among the plurality of UEs and carries a corresponding transmit signal that is derived exclusively from the data stream among the plurality of data streams that is intended for that UE.

Other embodiments include one or more of the following features. The precoding involves applying a layer-to-port precoding matrix to the plurality of data streams to yield the plurality of port signal streams among which each port signal stream is a linear combination of the plurality of data streams. The processing of the plurality of port signal streams effectively applies a port-to-beam precoding matrix to the plurality of port signal streams, wherein the port-to-beam matrix and the layer-to-port matrix when multiplied together generates a diagonal matrix, e.g. an identity matrix. The port-to-beam precoding matrix is applied to the plurality of port signal streams in the digital domain. Alternatively, the port-to-beam precoding matrix is applied to the plurality of port signal streams in the analog domain. The processing involves applying beamforming weights to the phased array antenna system to generate the plurality of transmit beams. The processing involves converting the plurality of port signal streams from digital to analog to generate a plurality of analog signal streams; and in the analog domain applying beamforming weights to the phased array antenna system to generate the plurality of transmit beams. The beamforming weights also cause the phased array antenna system to undo the precoding that was performed on the plurality of data streams. The beamforming weights cause the phased array antenna system to effectively apply a port-to-beam precoding matrix to the plurality of analog signal streams, wherein the port-to-beam matrix and the layer-to-port matrix when multiplied together generates a diagonal matrix. The port-to-beam precoding matrix is constructed from N precoding vectors that are mutually orthogonal, and wherein N is an integer equal to the number of data streams within the plurality of data streams. The N precoding vectors are selected from a MU-MIMO codebook. The layer-to-port precoding matrix is a non-diagonal matrix, the port-to-beam precoding matrix is a non-diagonal matrix, and the product of the layer-to-port precoding matrix and the port-to-beam precoding matrix is a diagonal matrix.

The approaches described herein apply equivalently to both downlink transmissions and uplink receptions. The descriptions below for the downlink are intended only for illustration but should not be construed in any way to be limited only to downlink transmissions.

Before undertaking the detailed description below, it may be advantageous to set forth some terminology used throughout this patent document. The terms 'beam' and 'TXRU' are used interchangeably since they are mapped one-to-one to each other and each TXRU module or hardware chain is responsible for generating one beam. The terms 'port-to-beam mapper', 'port to TXRU mapper' are used interchangeably and the terms 'precoder (precoding)' and 'mapper (mapping)' are also used interchangeably. The term 'spatial direction' is used to refer to individual sub-beams/lobes (within a single beam) where each individual sub-beam points in a certain physical direction.

BRIEF DESCRIPTION OF DRAWINGS

FIG. 1 indicates the codebook of rank 1 precoders for a 2T system.

FIG. 2 indicates the codebook of rank 1 precoders for a 4T system.

DETAILED DESCRIPTION

FIGS. 1 through 10, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless system.

Figure 3:
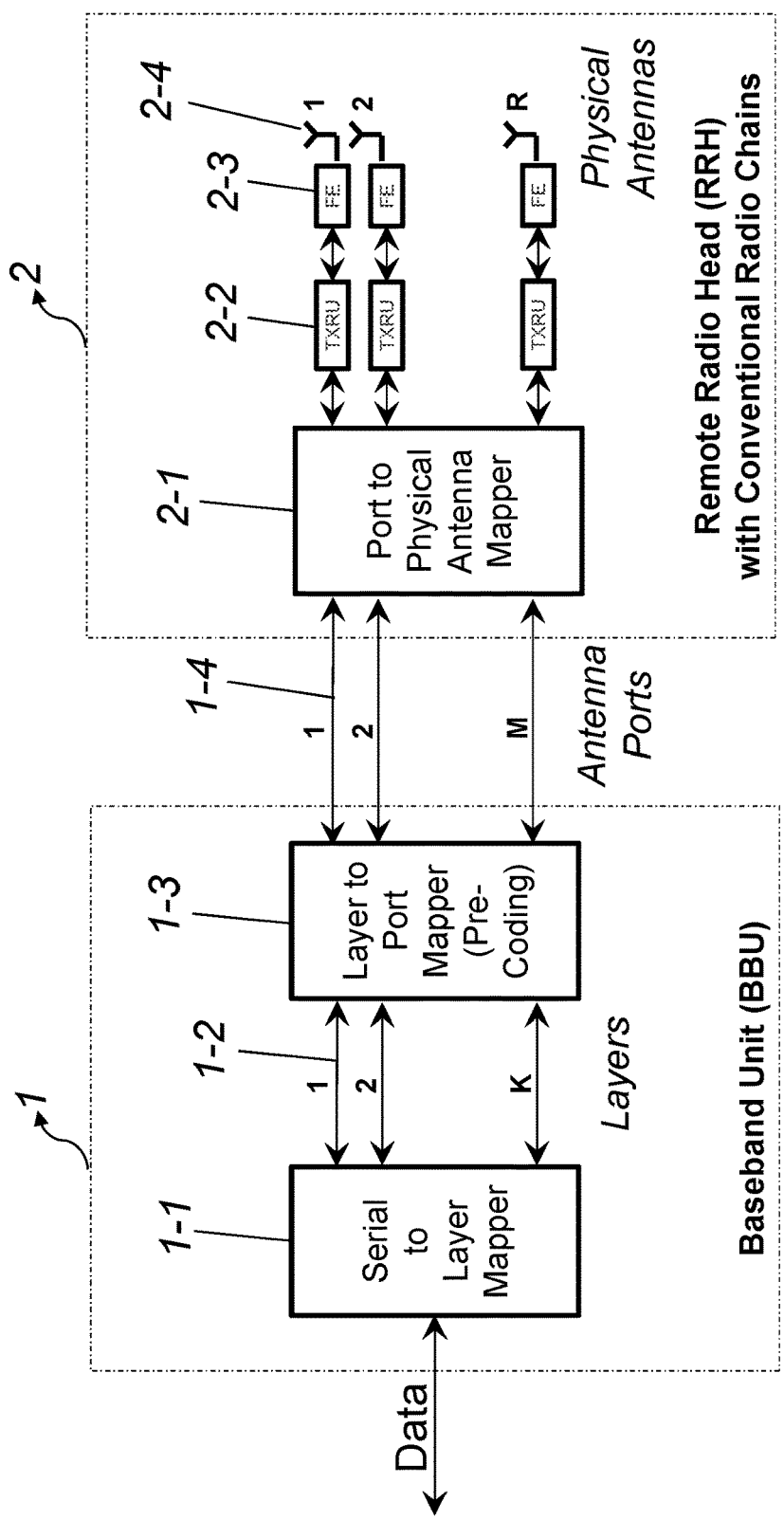
FIG. 3 provides a block diagram depicting various stages of precoding in a passive antenna system with conventional radio chains in the RRH.
Figure 4:
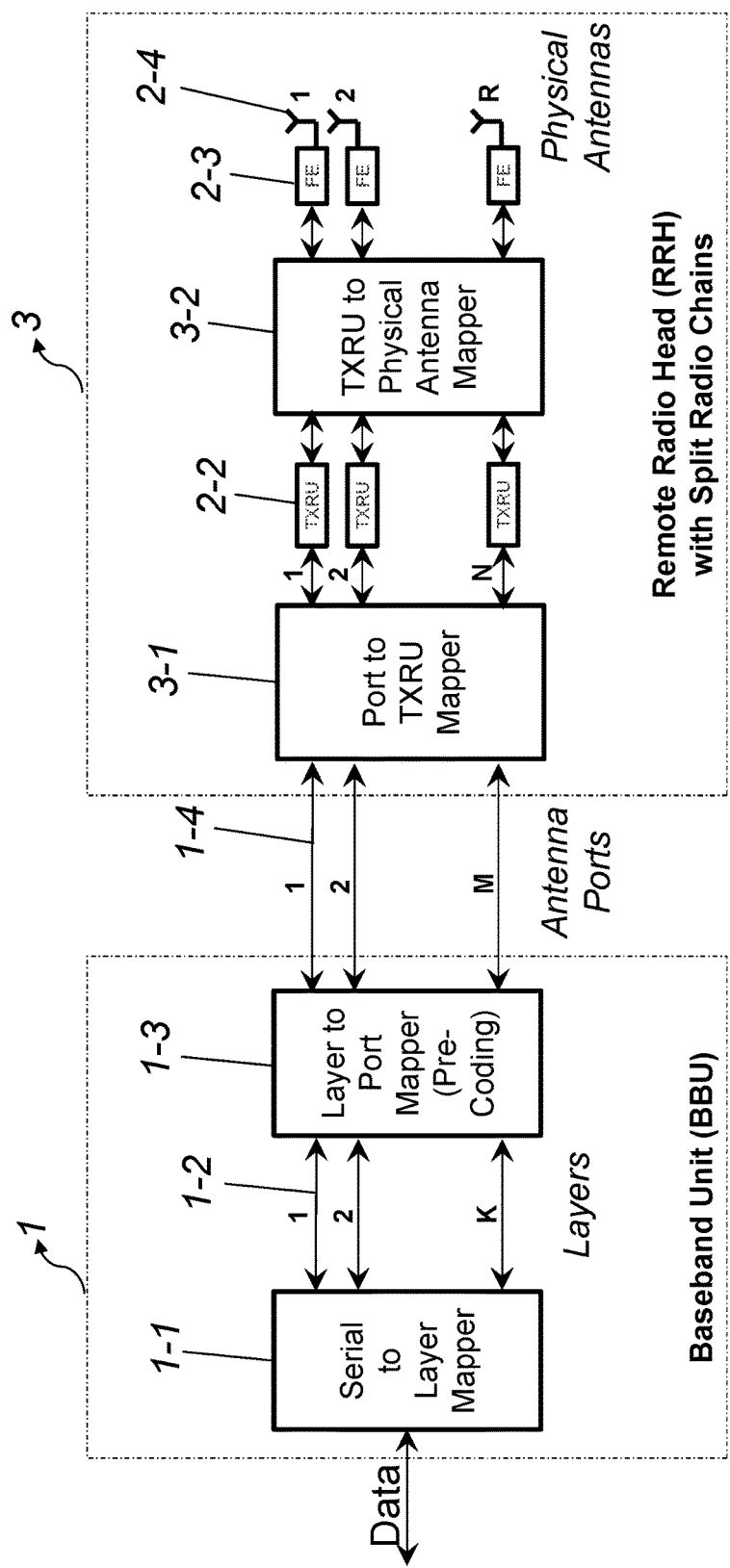
FIG. 4 provides a block diagram depicting various stages of precoding in an active antenna system with split radio chains in the RRH.

The downlink of a wireless system includes a base station (BS) transmitting data to several UEs located in the coverage of the base station. The base station strives to boost the capacity experienced by all the UEs in its coverage through various techniques such as intelligent resource scheduling, spatial multiplexing using multiple antennas, and precoding data streams to eliminate inter-stream interference. The base station consists of the base hand unit (BBU) 1 and the remote radio head t RRH) 2 or 3 as shown in FIG. 3 and FIG. 4. The BBU is responsible for the digital processing operations while the RRH is responsible for other functions such as shaping the signal to avoid subsequent non-linearities in the power amplifier (PA) and altering the sampling rate to make the signal compatible with the rates of the digital-to-analog/analog-to-digital (DAC/DC) converter units. The baseband output is connected to the RRHs via a single optical fiber which transports signals using the Common Public Radio Interface (CPRI) or the Open Base Station Architecture Initiative (OBSAI) protocols.

The RRH includes modules that map the baseband outputs to physical antennas. In particular, it includes DACs and ADCs to convert digital samples to analog waveforms in the downlink and analog waveforms to digital samples in the uplink. The RF chain performing the digital-to-analog and analog-to-digital conversion and up-down conversion operations for one stream is collectively referred to as the Transceiver Unit (TXRU or TXRU module) 2-2 for that stream. Furthermore, the RRH also includes (a) components responsible for shaping the signal using crest factor reduction (CFR) and digital pre-distortion (DPD) to reduce PA PR and avoid PA non-linearities and (b) other RF components such as PAs, duplexers mixers and analog filters tuned to the center frequencies of interest. This group of components is collectively referred to as the Front End (FE) 2-3. Finally, the RRHs also contain the physical antennas 2-4 used to form the radiation/beam pattern.

FIG. 3 shows a block diagram of various components in the base station of a passive antenna system. The data in bits intended for the UEs is encoded, modulated, and then parallelized by the serial to layer mapper 1-1 to produce K parallel streams of I-Q symbols called layers 1-2. The layers 1-2 are then precoded by the layer-to-port mapper 1-3 to produce symbols for antenna ports 1-4. Note that in the case of Multi-User MIMO (MU-MIMO), a layer corresponds to the signal meant for the corresponding unique UE. In 3GPP standards, the term layers is used interchangeably to refer to data streams which can be intended for the same UE or multiple UEs. But, sometimes multiple layers can be sent to a single UE, which is known as single user MIMO (SU-MIMO).

Wireless standards typically define what are called antenna ports (AP) 1-4 at the BBU which do not correspond to physical antennas, but rather are logical entities distinguished by their reference signals. To assist channel estimation, the BBU sends on each antenna port a reference signal, which is a pilot known to all UEs. Each antenna port is associated with its own cell-specific reference signal (CRS). In the case of multiple antenna ports, to avoid interference between the different signals of the antenna ports, when an antenna port sends its reference signal, other antenna ports keep silent in the corresponding time-frequency resources. A UE estimates the channel separately for each antenna port using the corresponding reference signal. In addition, the CRS is also used to coherently demodulate all the downlink signals. The precoded I-Q symbols corresponding to the antenna ports are then mapped to the R physical antennas 2-4 by the port to physical antenna mapper 2-1 using a fixed and pre-determined set of weights giving rise to a set of wide beams.

FIG. 4 shows a block diagram of the base station components in an active antenna system. In this case, the modulated symbols corresponding to M antenna ports 1-4 are mapped to N TXRUs 2-2 with a port-to-TXRU mapper 3-1 where they can be combined in different ways. The I-Q samples from the TXRUs 2-2 are then mapped in the analog domain to the R physical antennas 2-4 using a TXRU-to-antenna mapper 3-2. In the passive antenna system in FIG. 3, one can notice that the TXRUs and the FEs form one single chain while in the active antenna system of FIG. 4, the TXRUs and the FEs form a split radio chain due to the TXRU to physical antenna mapper 3-2. The enhanced flexibility of the active antenna system over the passive system can be noted with the two additional mappers 'port-to-TXRU mapper' 3-1 and 'TXRU-to-Physical Antenna Mapper' 3-2. The modulation symbols corresponding to antenna ports 1-4 can be flexibly mapped one-to-one to the transceiver units (TXRU) 2-2 or can be linearly combined and fed to the TXRU units. In Other words, the modulation symbol from each AP can be arbitrarily 'precoded' onto the TXRUs using a precoding vector. Similarly, each TXRU could be potentially connected to all the antenna elements in the array (called the full-connection method) or only a subset of them (known as the sub-array partition method). The choice of the connection can be kept flexible by the choice of weights in the TXRU to Physical Antenna Mapper 3-2. The signals from the TXRUs can be linearly combined with complex weights (phase shift and magnitude) and fed to the physical antennas 2-4; and by adjusting these weights, the TXRUs can produce narrow beams and steer them in different spatial directions. The complex weights comprising magnitude and phase components can be dynamically adjusted and re-configured in software.

Figure 6:
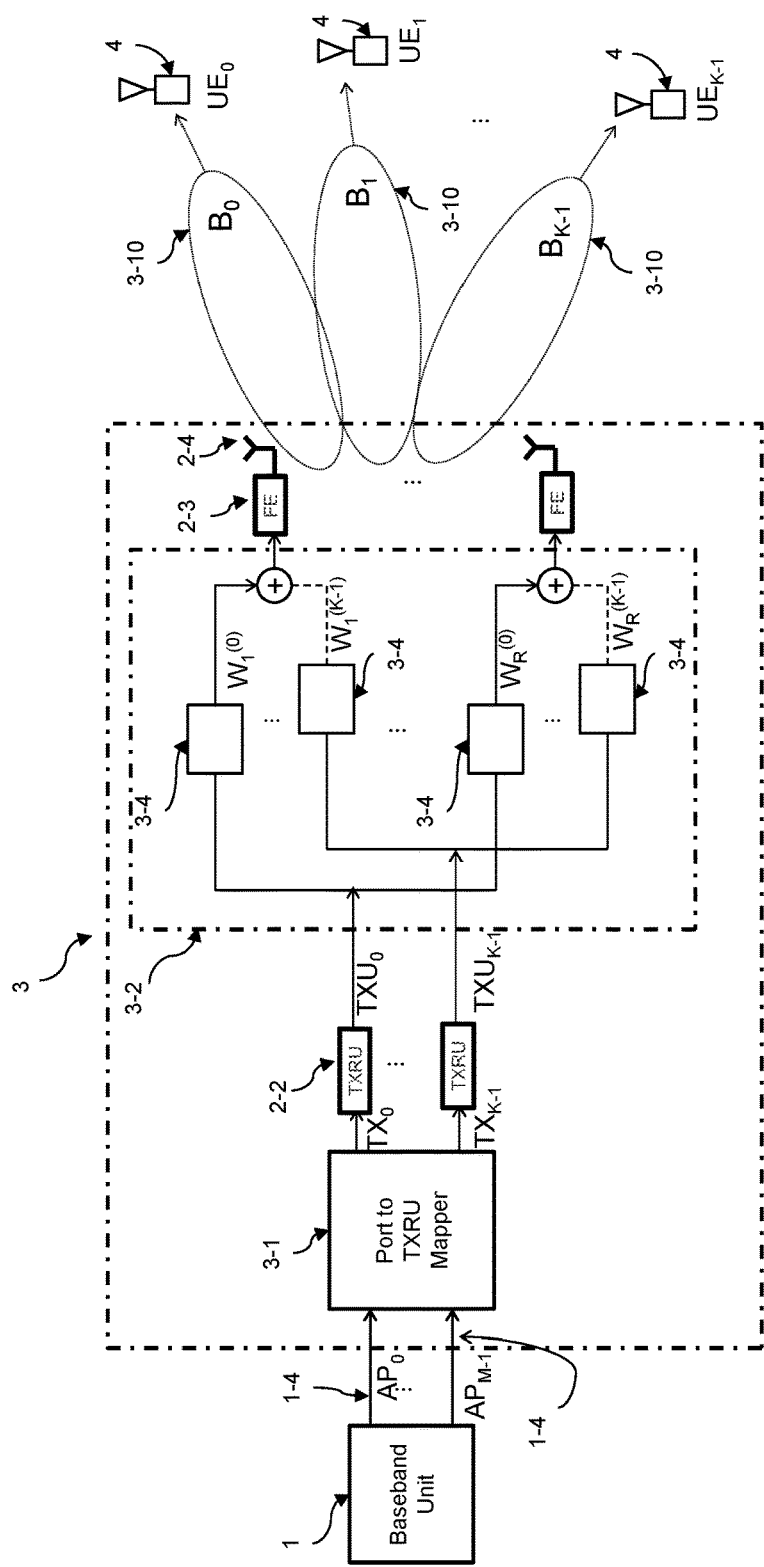
FIG. 6 shows an active antenna system with M antenna ports, K TXRUs generating K beams by setting the weights (phase and magnitude) inside the TXRU to physical antenna mapper.

FIG. 6 illustrates the downlink operation of a typical active antenna system (AAS) in cellular wireless networks. A baseband unit (BBU) 1 generates the digital signals at baseband for each of its M antenna ports (APs) 1-4: $AP_0$ through $AP_{M-1}$. Typically, the RRH converts the digital signals at the APs to analog, and also up-converts the signals from baseband to radio frequency (RF) to be radiated through its antenna elements. Inside the RRH, the M AP signals may be mapped to K TXRUs 2-2 through the port-to-TXRU mapping network 3-1 to form K digital signal streams: $TX_0$ through $TX_{K-1}$, each of which is processed by a corresponding TXRU transceiver to produce K analog signal streams: $TXU_0$ through $TXU_{K-1}$. In a simple application, the TX signal streams may be the same as the AP signals with K=M, $TX_0=AP_0, \ldots, TX_{M-1}=AP_{M-1}$. Note that an RRH may convert the baseband signals to RF through one or more intermediate frequencies (IFs), and the port-to-TXRU mapping and other subsequently described internal RRH operations may be performed at baseband IF, or RF.

In a general implementation of an AAS with R antenna elements, each $TXU_n$ signal may be tanned out in a TXRU to physical antenna mapper 3-2 to generate R copies, where a complex beam coefficient $w_r^{(n)}$ is applied to copy r of $TXU_n$. The application of a beam coefficient has the effect that the eventual RF signal is scaled (i.e., multiplied) with the magnitude component of $w_r^{(n)}$, and phase-shifted by the phase component of $w_r^{(n)}$, regardless of whether the operation is carried out at baseband, IF or RF. For example, in FIG. 6, a set of beam coefficients 3-4 $w_1^{(0)}$ through $w_R^{(0)}$ is applied to signal $TXU_0$, and a set of beam coefficients $w_1^{(K-1)}$ through $w_R^{(K-1)}$ is applied to signal $TXU_{K-1}$. For each antenna element r, the K TXU signals are summed, up-converted to RF (if not already at RF) inside the front end (FE) 2-3, and finally radiated through physical antenna r 2-4.

The plurality of physical antennas 2-4 are spaced close together, typically a fraction of wavelengths apart at the desired RF. When signals at the physical antennas are properly synchronized, and they are under suitable magnitude and phase control through the beam coefficients, the AAS is able to shape or focus RF energy in desired spatial directions. Such formation of focused RF energy at different directions is typically referred to as a transmit beam, or simply, beam, in AAS. In FIG. 6, a plurality of beams 3-10 $B_0$ through $B_{K-1}$ are shown to serve a plurality of UEs 4 $UE_0$ through $UE_{K-1}$. When the beams are properly formed, in a cellular wireless system, a user equipment (UE) $UE_0$ receives primarily signals of beam $B_0$. Likewise, $UE_1$ receives primarily signals of beam $B_1$, and $UE_2$ receives primarily signals of beam $B_2$. Note that the 'beams' in FIG. 6 are indicated to point in one specific 'spatial direction (SD)' only for ease of illustration but the notion of a 'beam' is much more general and a single beam can comprise of multiple sub-beams each pointing in a separate spatial direction. In fact, in a physical environment with many scatterers, the 'beam' can be designed in a general way (without pointing in one specific direction) to maximize the strength of the transmit signal for a given UE by selling the transmit beam coefficients in accordance with some side-information about the scattering environment.

MU-MIMO is a multi-antenna transmission technique where the base station transmits multiple streams to multiple users in the same time-frequency resource by exploiting the spatial diversity of the propagation channel. In order to fully exploit MU-MIMO, the data streams intended for multiple UEs need to be sufficiently well-separated, ideally orthogonal. To achieve this orthogonality, the BBU precodes the data layers intended for multiple UEs and maps them onto the antenna ports using the layer-to-port mapper 1-3. For the precoding operation, the BBU relies on the feedback of channel suite information (CSI) from the UEs and picks a precoder for each UE to map the modulation symbols intended for that UE onto the antenna ports. In general, the BBU utilizes CSI feedback information from all UEs and chooses a precoding matrix 1-3 in such a way that the data streams intended for different UEs are transmitted over the air with no interference. The precoding matrix is a set of precoding vectors, one vector for each input signal stream. The precoding vectors may be, but are not necessarily always, orthogonal to each other. Ideally, the preceding matrix when multiplied with the channel matrix (depending on the electromagnetic propagation environment) gives a diagonal matrix, which physically means that precoding removes interference and effectively creates non-interfering parallel pipes of communication to the individual UEs. In other words, the BBU aims to choose a precoding matrix which cancels the interference effect caused by the propagation channel. One example of such precoding is zero-forcing. It is important to note that this 'layer-to-antenna port' precoding is applied at the BBU prior to the 'antenna port-to-TXRU' precoding applied at the RRH as depicted in FIG. 4.

In order to reduce the overhead of feedback from the UEs, wireless systems typically employ quantized codebooks where the number of precoding vectors in the codebook is limited. First, each UE estimates the channel vector from measurements on the reference signals corresponding to each antenna port. Then, from the entire codebook of precoding vectors, the UE chooses that vector which matches best its channel estimates (in a minimum mean squared error sense) and feeds it back as an index, namely, the preceding matrix indicator (PMI). For instance, in a 2T system, a UE feeds back a preceding matrix indicator (PMI) representing the best precoder from a pre-defined codebook in FIG. 1 containing 4 rank-1 vectors. Similarly, in a 4T system, a UE feeds back a PMI from a pre-defined set of 16 rank-1 vectors (see FIG. 2).

In MU-MIMO transmission, there are two types of preceding the BBU can employ: 1) Non-codebook based precoding; and 2) Codebook based precoding. In non-codebook based precoding, the BBU is flexible to choose any precoder of its own choice based on the CSI feedback from the UEs. For instance, the BBU can choose to optimally eliminate inter-UE interference by resorting to zero-forcing techniques. On the other hand, in codebook based preceding, the BBU is forced to choose a precoder from a quantized codebook defined in wireless standards to limit feedback overhead. Codebook based MU-MIMO operation is widely deployed in current wireless base stations as part of the legacy releases of wireless standards (such as LTE Rel. 8). The more flexible non-codebook based MU-MIMO operation was introduced only in future releases of wireless standards and has not been deployed yet in majority of existing practical systems.

In conventional systems with passive antennas as shown in FIG. 3, the modulation symbols corresponding to antenna ports 1-4 after applying the layer-to-port precoding 1-3 at the BBU are mapped one-to-one to a physical antenna 2-4 using the port to physical antenna mapper 2-1 giving rise to wide beams covering an entire sector. In the illustrated embodiment of FIG. 3, there are K layers, M antenna ports, and R antenna elements in a two-dimensional antenna array. M is equal to the number of columns in the 2D antenna array. Assuming the 2D antenna array has 12 rows and 4 columns of antenna elements, R=48 while M=4. The wide beams produced by the antenna array radiate in fixed elevation angles with a wide coverage in azimuth since each physical antenna 2-4, comprising only of a single column of elements, cannot exploit the entire aperture of an array and has no resolution in azimuth. The wide beams radiate in a pre-determined fashion and therefore cannot be re-configured as desired into narrow beams radiating in different directions. As a consequence, the data streams intended for separate UEs interfere significantly with each other. Furthermore, since the CSI feedback of the UEs is quantized and inaccurate, it is hard for the BBU to eliminate interference. Moreover, in codebook based MU-MIMO operation, the BBU is severely limited in its choice of preceding due to the limited resolution of the standardized codebooks further degrading its ability to eliminate inter-UE interference. The goal of precoding is to counter the effect of the channel and transmit independent data layers to UEs with minimal inter-stream interference. However, with wide beams and limited resolution of codebooks, it is hard to eliminate such interference thus leading to poor MU-MIMO performance in conventional passive antenna systems.

A Conventional System

Figure 5:
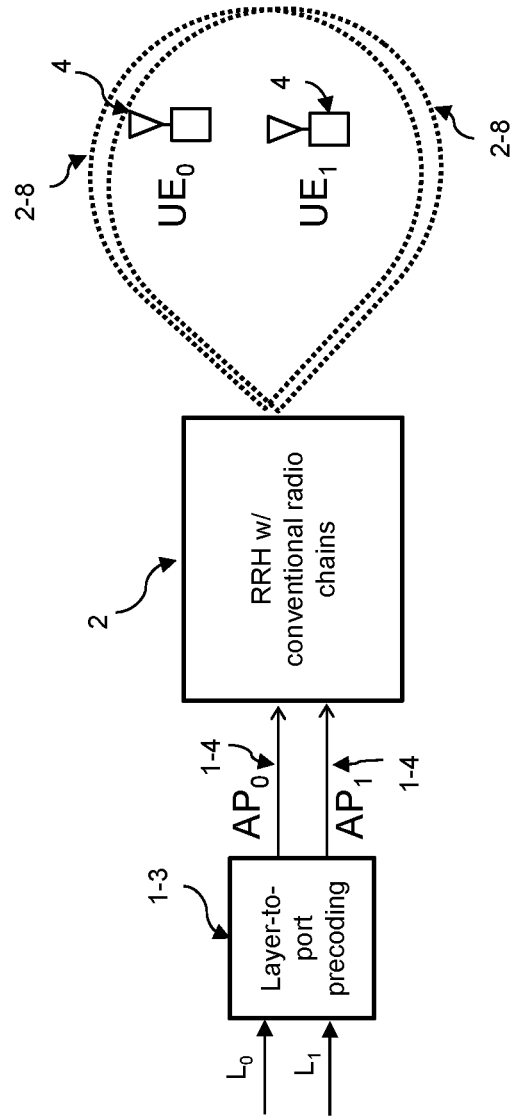
FIG. 5 shows a conventional 2T system with passive antennas producing wide beams covering an entire sector.

FIG. 5 depicts the downlink of a conventional wireless system with a two transmit (2T) base station capable of generating only wide beams. In other words, the baseband unit (BBU) has two transmit antenna ports $AP_0$ and $AP_1$ and is capable of multiplexing 2 layers/data streams. With the BBU operating in MU-MIMO transmission mode (typically available in cellular and WiFi systems, e.g., LTE and 802.11 ac), two parallel data streams are transmitted simultaneously to two UEs 4 ($UE_0$ and $UE_1$) on the same time-frequency resource. The BBU precodes $UE_0$ data layer $L_0$ and $UE_1$'s data layer $L_1$ with two vectors respectively chosen from the wireless standard's pre-defined codebook $S_1$ of 4 vectors given in FIG. 1. In codebook based precoding, a precoding vector for a given UE is chosen to be the PMI fed back by that UE. Thus, the BBU is restricted to choose the precoder from a limited number of PMI vectors available in the codebook. Moreover, it is best in terms of capacity performance for the BBU to follow the UE's recommendation and choose that PMI as precoder for the UE's data layer.

In conventional 2T systems employing passive antennas, $AP_0$ and $AP_1$ are mapped one-to-one to two wide beams as shown in FIG. 5. The two UEs, $UE_0$ and $UE_1$, measure the channel from the orthogonal reference signals $CRS_0$ (Cell-specific Reference Signal) and $CRS_1$ and report their respective rank-1 PMIs chosen from the codebook $S_1$ in FIG. 1. The choice of PMI depends on the measurement by the UE of its propagation channel from the antenna ports $AP_0$ and $AP_1$. The BBU receives the PMI feedback $P_0$ from $UE_0$ and $P_1$ from $UE_1$ and forms the layer-to-port preceding mapper by using the same vectors $P_0$ to precode $UE_0$'s data layer and $P_1$ to precode $UE_1$'s data layer.

However, due to limited resolution of the codebook $S_1$ and the wide nature of the beams 2-8, codebook-based precoding employed by the BBU is insufficient to eliminate interference among $UE_0$ and $UE_1$'s data layer resulting in poor MU-MIMO capacity performance.

General Description of the Port-to-Beam Precoder

This section provides a general description of and exemplary embodiment and specific example applications are discussed in later subsections. This is only to illustrate the underlying principles and should not be construed m any way to limit the scope of the disclosure.

Figure 7:
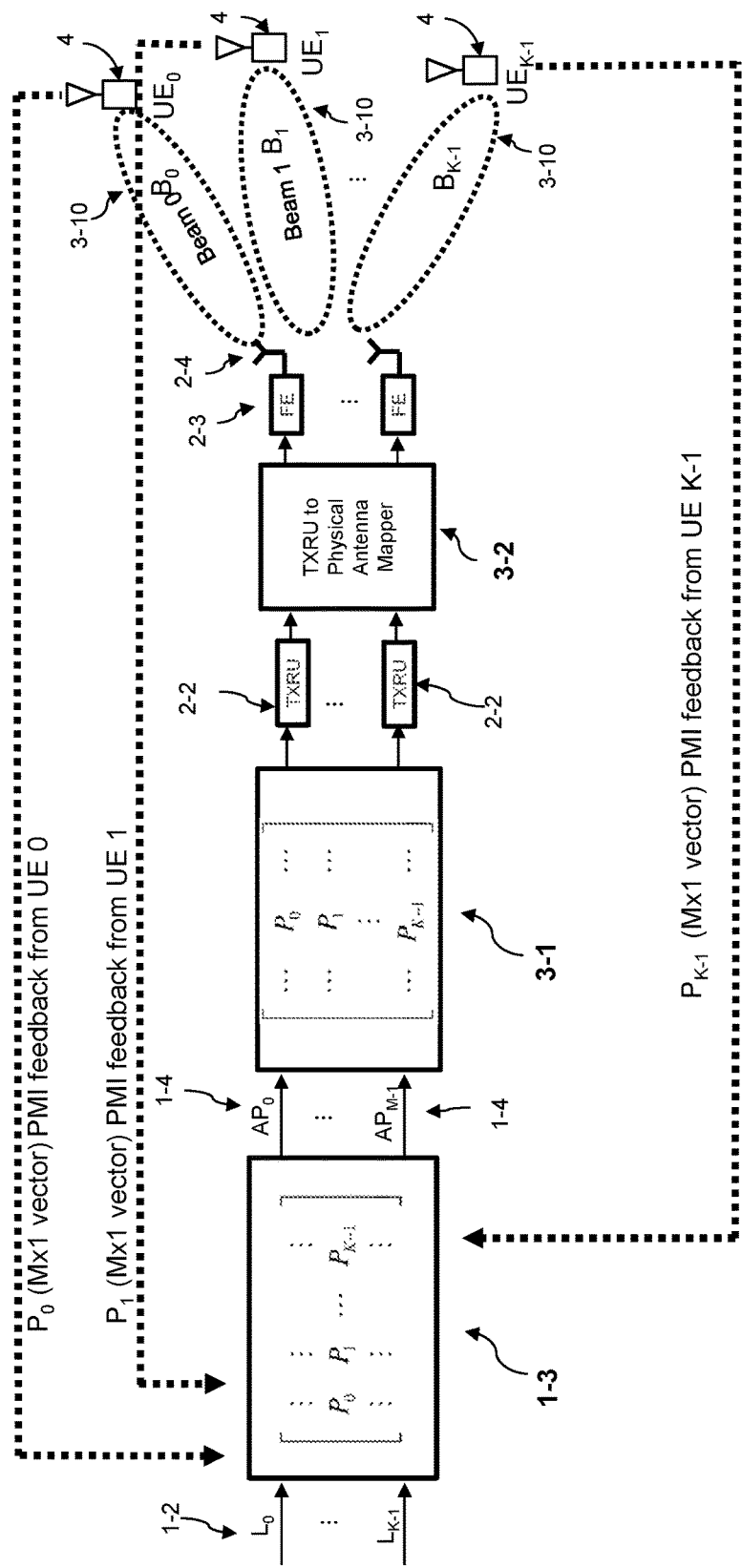
FIG. 7 shows an embodiment which enables spatial multiplexing of data layers to different UEs, one data layer in each beam separately to each UE.

FIG. 7 depicts an active antenna system with a BBU having M antenna ports (referred to as an 'M'T system) and an RRH having K RF chains (TXRUs) with each TXRU producing one narrow beam. Thus, there are K beams in total. Within each beam's coverage, there is one UE to be served data on that beam. Therefore, in total, K UEs are served data simultaneously on the same time-frequency resource by spatially multiplexing one UE in each beam. The BBU has M antenna parts $AP_0, AP_1, \ldots, AP_{M-1}$ and is capable of multiplexing K data layers. Typically, in practical systems, the number of UEs K scheduled for MU-MIMO is smaller than or equal to the number of antenna ports M, i.e., K≤M.

The goal here is to servo a plurality of UEs 4 (i.e., $UE_0$, $UE_1, \ldots, UE_{K-1}$) in a plurality of beams 3-10 (i.e., $B_0$, $B_1, \ldots, B_{K-1}$) respectively with minimal interference across the streams. The beams are generated by an AAS RRH (either on the co-polarized antenna elements or cross-polarized antenna elements) in such a way that they are orthogonal to each other. Therefore, If $AP_0$-$AP_{M-1}$ are mapped directly to beams $B_0$-$B_{K-1}$, the ideal PMI feedback that $UE_0$ is expected to report is $$\begin{bmatrix} 1 \\ 0 \\ \vdots \\ 0 \end{bmatrix}$$

indicating that $UE_0$ measures energy only on its own beam $B_0$ through the reference signal on $AP_0$ and sees negligible energy on the reference signals transmitted on other beams orthogonal to $B_0$. However, due to the limited resolution of the codebooks such as $S_1$ and $S_2$ in wireless standards, this PMI may not be available in the codebook and the UE reports a PMI which comes closest (in a minimum mean squared error sense) to its measurements from the reference signal pilots. If the BBU follows this recommendation to choose the precoding matrix at the layer-to-port precoding module 1-3, the inaccuracy of the feedback report may cause degradation in capacity. Thus, in one embodiment, the port to TXRU mapping module 3-1 is introduced where a linear combination of the modulated symbol streams from the antenna ports 1-4 is transmitted on each beam and the effect of module 1-3 is cancelled.

In FIG. 7, the RRH 3 uses the port-to-TXRU mapping matrix 3-1 to transmit a linear combination $\Sigma_{i=0}^{M-1} P_k(i) AP_i$ of the antenna port symbols $AP_0$ to $AP_{M-1}$ on beam $B_k$ for all the beams k=0 to K−1 (3-10). Here, $P_k(i)$ is the i-th element of the M×1 precoding vector $P_k$, i.e., $P_i=[P_i(0), P_i(1), \ldots, P_i(M-1)]^T$. Furthermore, the precoding vectors $P_0, P_1, \ldots, P_{K-1}$ are picked from the codebooks $S_1$ and $S_2$ prescribed by the wireless standard and are chosen to be mutually orthogonal.

The port to TXRU mapping 3-1 can be readily implemented digitally inside the RRH. The following important features should be noted about this precoding:

1. In practical systems, the Primary and Secondary Synchronization Signals (PSS/SSS) required for the UE to obtain timing/frequency offsets and get attached to the base station are transmitted only on $AP_0$. Since $AP_0$ is sent on all beams 3-10 $B_0$ to $B_{K-1}$ due to the linear combination operation at 3-1, all UEs $UE_0$-$UE_{K-1}$ can decode them and attach to the base station.
2. The reference signals $CRS_0$-$CRS_{M-1}$ corresponding to antenna port $AP_0$-$AP_{M-1}$ remain orthogonal despite the port-to-learn precoding because, as explained earlier, the M reference signals $CRS_0$-$CRS_{M-1}$ occupy separate OFDM time-frequency resource elements. Given a time-frequency resource element, if $CRS_0$ is active on that element, then the other reference signals are blank on that element. Therefore, despite the linear combination of antenna ports, the UE can still measure each reference signal separately in order to feed back the channel parameters PMI, Rank Index (RI) and Channel Quality Indicator (CQI).
3. With $\Sigma_{i=0}^{M-1} P_0(i) AP_i$ transmitted on beam $B_k$ and $B_k$ being sufficiently narrow, all reference signals $CRS_0$-$CRS_{M-1}$ are expected to experience the same wireless propagation environment (channel). The difference in measurements of $CRS_0$-$CRS_{M-1}$ at $UE_k$ is caused only by the phase shifts that $P_k$ introduces in the linear combination $\Sigma_{i=0}^{M-1} P_0(i) AP_i$. This forces $UE_k$ to always feed back a PMI of $P_k$. During this reference signal transmission phase, for the $P_k$'s used in the port-to-beam mapper, any set of $P_k$'s can be picked from the codebook so long as they are orthogonal to each other. This forces the UE's to feed back those $P_k$'s to the BBU.
4. Despite $AP_k$ being mapped to multiple beams, $UE_k$ in beam $B_k$ is expected to experience minimal interference on the reference signal $CRS_k$ from other beams (either through side lobes or scattering in the environment) resulting in the PMI feedback as described above. This is because the beams are designed in such a way that they narrowly focus electromagnetic radiation towards the desired UEs and have a null in their radiation pattern along the directions of other UEs not intended to be served on that beam.
5. Based on the PMI feedback from the UEs 4, the BBU, operating in codebook based MU-MIMO transmission mode, would follow the recommendations of all the UEs and choose precoder $P_k$ for $UE_k$'s data layer/stream in the matrix multiplication module 1-3. Note again that these precoders are chosen from the rank-1 codebooks $S_1$ and $S_2$ available in wireless standards (see FIG. 1 and FIG. 2 for 2T and 4T codebooks respectively).
6. As can be noticed from FIG. 7, after the UE data streams/layers $L_0$-$L_{K-1}$ get precoded by the M×K preceding matrix 1-3 at the BBU, they get subjected to another block of preceding in the RRH by the K×M port-to-beam mapping matrix 3-1. Since the precoding vectors $P_0, P_1, \ldots, P_{K-1}$ are chosen to be mutually orthogonal, the port-to-beam mapping 3-1, in fact, cancels or undoes the effect of the BBU precoder 1-3 resulting in the multiplexing of the K UE data streams $L_0$-$L_{K-1}$ along the K beams to the K UEs respectively, i.e., $UE_k$'s data stream gets transmitted on beam $B_k$ exclusively to $UE_k$ for all k=1 to K−1 with minimal interference. In other words, effectively, $UE_0$'s data layer $L_0$ is precoded by the vector $$\begin{bmatrix} 1 \\ 0 \\ \vdots \\ 0 \end{bmatrix},$$

UE1's data layer $L_1$ is precoded by the vector $$\begin{bmatrix} 0 \\ 1 \\ \vdots \\ 0 \end{bmatrix},$$

and similarly other UEs get precoded by other unit vectors as described below by the mathematical equation:

$$\underbrace{\begin{bmatrix} \cdots & \cdots & P_0 & \cdots & \cdots \\ \cdots & \cdots & P_1 & \cdots & \cdots \\ \cdots & \cdots & \vdots & \cdots & \cdots \\ \cdots & \cdots & P_{K-1} & \cdots & \cdots \end{bmatrix}}_{\text{Port-to-TXRU precoding 3-1}}$$

-continued $$\begin{bmatrix} \vdots & \vdots & & \vdots \\ \underbrace{P_0 & P_1 & \cdots & P_{K-1}}_{\text{Layer-to-port precoding 1-3}} \\ \vdots & \vdots & & \vdots \end{bmatrix} \begin{bmatrix} L_0 \\ L_1 \\ \vdots \\ L_{K-1} \end{bmatrix} = \begin{bmatrix} 1 & 0 & \cdots & 0 \\ \vdots & 1 & \cdots & \vdots \\ \vdots & \vdots & \ddots & \vdots \\ 0 & 0 & \cdots & 1 \end{bmatrix} \begin{bmatrix} L_0 \\ L_1 \\ \vdots \\ L_{K-1} \end{bmatrix} = \begin{bmatrix} L_0 \\ L_1 \\ \vdots \\ L_{K-1} \end{bmatrix}$$

The above equation follows from the fact that the preceding vectors $P_0, P_1, \ldots, P_{K-1}$ are chosen to be mutually orthogonal, i.e., $$P_i^t P_j = \begin{cases} 0, & i \neq j \\ 1, & i = j \end{cases}$$

Where $P_i^t$ denotes the transpose of the preceding vector $P_i$.

Design Principle of Port-to-TXRU Mapping

In summary, the port-to-beam precoding 3-1 has two key properties which make it a simple yet powerful tool to enable spatial multiplexing:
1. The port-to-beam precoder 3-1 operates on the reference signals from antenna ports in such a way that the UEs are tricked into constantly feeding back fixed PMIs. This enables the RRH to predict the precoder chosen by the BBU.
2. In addition, the port-to-beam precoder 3-1 cancels or undoes the effect of the fixed layer-to-port precoder 1-3 at the BBU and multiplexes the data layers $L_0$-$L_{K-1}$ to the respective UEs without interference. In other words, the data layers $L_0$-$L_{K-1}$ are mapped onto the respective transmit beams (i.e., the beams that are directed to the UEs to which the respective data layers are intended) as though no layer-to-port precoding was every performed back at the BBU.

In fact, any K orthogonal PMI vectors in the codebook satisfying the above two properties can be chosen to form the port-to-beam precoder 3-1.

From the above features of the port-to-beam precoding matrix 3-1, one can conclude that such precoding enables spatial multiplexing/MU-MIMO to multiple UEs in compliance with codebook-based feedback and precoding techniques deployed in current wireless standards.

EXAMPLES

In accordance with various embodiments, specific examples are now provided for illustrating the concept. These examples are immediately applicable to current wireless systems such as LTE deploying BBUs with 2T and 4T antenna ports. This should not be construed in any way as to limiting the scope of the disclosure.

1. Enabling Codebook Based MU-MIMO in a 2T System with AAS-2 Layers

Figure 8:
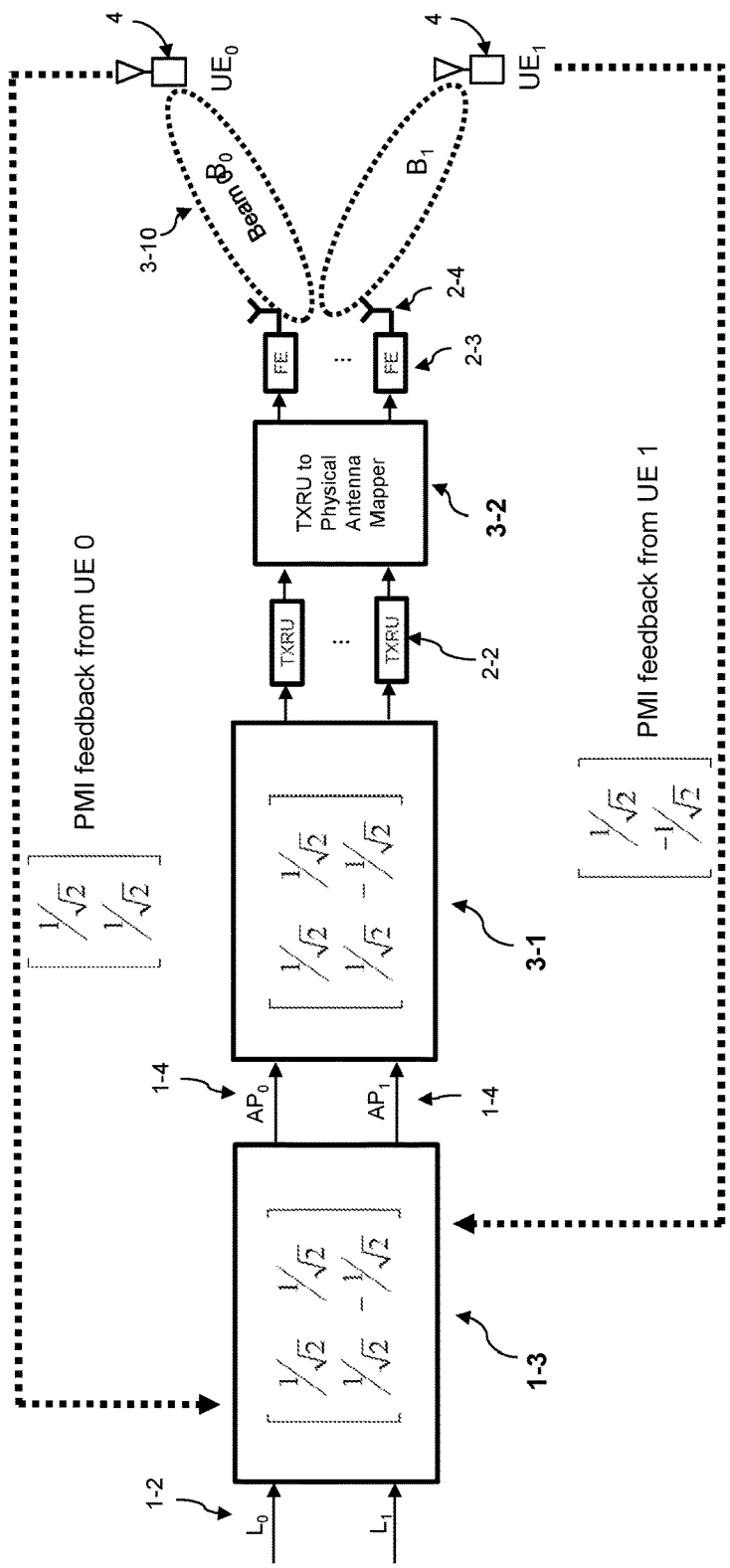
FIG. 8 illustrates an embodiment in a 2T system with layers

FIG. 8 shows an embodiment involving a 2T system. In this system, there are two layers $L_0$ and $L_1$ to be multiplexed to two UEs $UE_0$ and $UE_1$ respectively. The BBU has two antenna ports $AP_0$ and $AP_1$ respectively and the RRH has two TXRUs. We assume that the beams are generated by an AAS RRH (either on the same polarization or opposite) in such a way that they are orthogonal to each other. Therefore, if $AP_0$ and $AP_1$ are directly mapped to beam $B_0$ and beam $B_1$ respectively, the ideal PMI feedback that the UE should report is $$\begin{bmatrix} 1 \\ 0 \end{bmatrix}.$$

However, due to the limited resolution of the LTE codebook $S_1$, this PMI is not available and the UE reports a PMI which comes close in an MMSE sense. If the BBU follows this recommendation and chooses 1-3 accordingly, the inaccuracy in PMI feedback may degrade capacity, in order to force the UEs into feeding back the same PMIs constantly, the port-to-beam precoding method according to the approach described above sends a linear combination of the antenna ports on each beam.

The RRH transmits $$\frac{AP0 + AP1}{\sqrt{2}}$$

on beam $B_0$ and $$\frac{AP0 - AP1}{\sqrt{2}}$$

on beam $B_1$. Note that the $\sqrt{2}$ factor is introduced to normalize transmit power. This linear combination operation enables spatial multiplexing in the following way:
1. Since $AP_0$ is present on both beams, the Primary and Secondary Synchronization Signals (PSS/SSS) are sent on both the beams enabling both $UE_0$ and $UE_1$ to decode them and attach to the base station.
2. The reference signals $CRS_0$ and $CRS_1$ corresponding to $AP_0$ and $AP_1$ remain orthogonal despite the precoding. This is because $CRS_0$ and $CRS_1$ occupy separate OFDM time-frequency resource elements. Given an OFDM resource element, if $CRS_0$ is active on that element, then $CRS_1$ is blank on the same element. Therefore, even with the port-to-beam precoding in place, the UE can measure $CRS_0$ and $CRS_1$ separately as in a conventional system in order to feed back the channel parameters PMI, Rank Index (RI) and Channel Quality Indicator (CQI).
3. With $$\frac{AP0 + AP1}{\sqrt{2}}$$

transmitted on beams $B_0$ and $B_0$ being sufficiently narrow and non-interfering with beam $B_1$, it is expected that $CRS_0$ and $CRS_1$ to experience the same wireless propagation environment forcing $UE_0$ to always feedback the same vector $$\begin{bmatrix} \frac{1}{\sqrt{2}} \\ \frac{1}{\sqrt{2}} \end{bmatrix}$$

as PMI.

4. With $$\frac{AP0 - AP1}{\sqrt{2}}$$

transmitted on beam $B_1$ and $B_1$ being sufficiently narrow, $CRS_0$ and $CRS_1$ are expected to experience the same propagation environment. The 180° phase shift introduced between $CRS_0$ and $CRS_1$ by the linear combination forces $UE_1$ to always feedback the same vector $$\begin{bmatrix} \frac{1}{\sqrt{2}} \\ \frac{-1}{\sqrt{2}} \end{bmatrix}$$

as PMI.

5. Despite AP0 (and AP1) being mapped to both beams, the UEs are expected to experience minimal interference on the reference signals $CRS_0$ (and $CRS_1$) from the other beam (either through side lobes or scattering in the environment) resulting in the PMI feedback as described above. This is because beams $B_0$ and $B_1$ are narrowly focused towards UEs in different directions and are mutually orthogonal.

6. Based on the PMI feedback from the UEs, the BBU, operating in codebook based MU-MIMO mode, would set the matrix multiplication operator 1-3 by choosing precoder $$\begin{bmatrix} \frac{1}{\sqrt{2}} \\ \frac{1}{\sqrt{2}} \end{bmatrix}$$

for $UE_0$'s data layer/stream and precoder $$\begin{bmatrix} \frac{1}{\sqrt{2}} \\ \frac{-1}{\sqrt{2}} \end{bmatrix}$$

for $UE_1$'s data layer/stream.

7. In FIG. 8, after the UE data streams get precoded by the BBU precoder 1-3, they get subjected to another block of precoding by the port-to-beam precoding 3-3 at the RRH. The port-to-beam preceding, in (act cancels the effect of the BBU precoder resulting in the multiplexing of the UE data streams across the two beams to the two UEs respectively, i.e., $UE_0$'s data stream $L_0$ gets transmitted on beam $B_0$ exclusively to $UE_0$ and $UE_1$'s data stream $L_1$ gets transmitted on beam $B_1$ exclusively to $UE_1$ with minimal interference. In other words, effectively, UE's data is precoded by the vector $$\begin{bmatrix} 1 \\ 0 \end{bmatrix}$$

and $UE_1$'s data is precoded by the vector $$\begin{bmatrix} 0 \\ 1 \end{bmatrix}$$

as described below in the mathematical equation:

$$\underbrace{\begin{bmatrix} \frac{1}{\sqrt{2}} & \frac{1}{\sqrt{2}} \\ \frac{1}{\sqrt{2}} & \frac{-1}{\sqrt{2}} \end{bmatrix}}_{\text{Port-to-port precoding 1-3}} \underbrace{\begin{bmatrix} \frac{1}{\sqrt{2}} & \frac{1}{\sqrt{2}} \\ \frac{1}{\sqrt{2}} & \frac{-1}{\sqrt{2}} \end{bmatrix}}_{\text{Layer-to-port precoding 1-3}} \begin{bmatrix} L_0 \\ L_1 \end{bmatrix} = \begin{bmatrix} 1 & 0 \\ 0 & 1 \end{bmatrix} \begin{bmatrix} L_0 \\ L_1 \end{bmatrix} = \begin{bmatrix} L_0 \\ L_1 \end{bmatrix}$$

2. Enabling Codebook Based MU-MIMO in a 4T System with AAS—4 Layers

Figure 9:
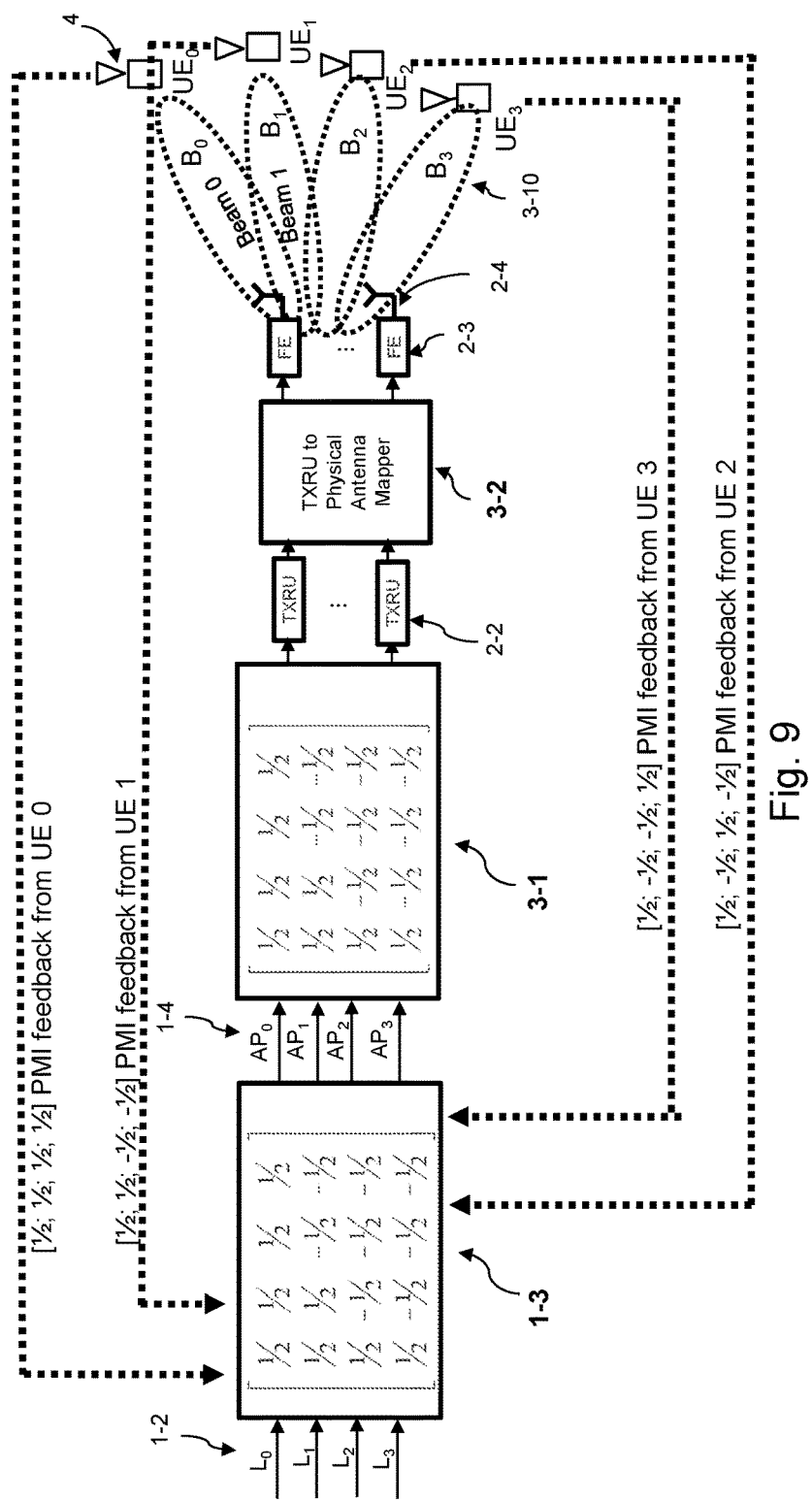
FIG. 9 illustrates an embodiment in a 4T system with 4 layers.

FIG. 9 shows the block diagram of an embodiment involving a 4T system with 4 layers. The BBB has 4 antenna ports $AP_0, AP_1, AP_2, AP_3$ and is capable of multiplexing four data layers, one to each UE. In this case, the port-to-beam precoding is designed as follows: (one example design is described in detail and other possible designs are provided at the end of this section)

In FIG. 9, the RRH transmits $$\frac{AP0 + AP1 + AP2 + AP3}{2}$$

on beam $B_0$, $$\frac{AP0 + AP1 - AP2 - AP3}{2}$$

on beam $B_1$, $$\frac{AP0 - AP1 - AP2 + AP3}{2}$$

on beam $B_2$ and $$\frac{AP0 - AP1 + AP2 - AP3}{2}.$$

Similar to the previous example, the following effects should be noted about this precoding:

1. With $$\frac{AP0 + AP1 + AP2 + AP3}{2}$$

transmitted on beam $B_0$ and $B_0$ being sufficiently narrow, reference signals $CRS_0$-$CRS_3$ experience the same wireless propagation channel forcing $UE_0$ to always feedback the same vector $[½ \; ½ \; ½ \; ½]^T$ as PMI. ($\alpha^T$ denotes the transpose of the column vector $\alpha$) from $UE_0$.

2. Similarly, with $$\frac{AP0 + AP1 - AP2 - AP3}{2}$$

transmitted on beam $B_1$ and $B_1$ being sufficiently narrow, all reference signals are expected to experience the same propagation channel. The phase shifts introduced by the linear combination across the reference signals force $UE_1$ to always feedback the same vector $[½\ ½\ -½\ -½]^T$ as PMI.

3. With $$\frac{AP0 - AP1 - AP2 + AP3}{2}$$

transmitted on beam $B_2$ and $B_2$ being sufficiently narrow, all reference signals are expected to experience the same channel. The phase shifts introduced by the linear combination across the reference signals result in a constant PMI feedback $[½\ -½\ -½\ ½]^T$ from $UE_2$.

4. With $$\frac{AP0 - AP1 + AP2 - AP3}{2}$$

transmitted on beam $B_3$ and $B_3$ being sufficiently narrow, all reference signals are expected to experience the same channel. The phase shifts introduced by the linear combination across the reference signals result in a constant PMI feedback $[½\ -½\ ½\ -½]^T$ from $UE_3$.

5. Based on the PMI feedback from the UEs, the BBU, operating in codebook based MU-MIMO transmission mode, would set the matrix multiplication operation 1-3 by choosing precoder $[½\ ½\ ½\ ½]^T$ for $UE_0$'s data layer/stream, precoder $[½\ ½\ -½\ -½]^T$ for $UE_1$'s data stream, precoder $[½\ -½\ -½\ ½]^T$ for $UE_2$'s data stream and precoder $[½\ -½\ ½\ -½]^T$ for $UE_3$'s data stream. Note again that these precoders are available in the rank-1 codebook $S_2$ for 4T wireless systems.

6. In FIG. 9, after the UE data streams get precoded by the BBU layer-to-port precoder 1-3, they get subjected to another block of precoding due to the port-to-beam precoding 3-1 at the RRH. This port-to-beam precoding cancels the effect of the BBU precoder resulting in the multiplexing of the UE data streams $L_0$-$L_3$ along beams $B_0$-$B_3$ to the four UEs respectively, i.e., $UE_0$'s data stream $L_0$ gets transmitted on $B_0$ exclusively to $UE_0$, $UE1$'s data layer $L_1$ on beam $B_1$ exclusively to $UE_1$, $UE_2$'s data on $B_2$ exclusively to $UE_2$ and $UE_3$'s data on $B_3$ exclusively to $UE_3$ with minimal interference. In other words, $UE_0$'s data is precoded by the vector $$\begin{bmatrix}1\\0\\0\\0\end{bmatrix},$$

$UE_1$'s data by the vector $$\begin{bmatrix}0\\1\\0\\0\end{bmatrix},$$

$UE_2$'s data by the vector $$\begin{bmatrix}0\\0\\1\\0\end{bmatrix}$$

and $UE_3$'s data by the vector $$\begin{bmatrix}0\\0\\0\\1\end{bmatrix}$$

as illustrated below by the mathematical equation:

$$\underbrace{\begin{bmatrix}\frac{1}{2}&\frac{1}{2}&\frac{1}{2}&\frac{1}{2}\\\frac{1}{2}&\frac{1}{2}&-\frac{1}{2}&-\frac{1}{2}\\\frac{1}{2}&-\frac{1}{2}&-\frac{1}{2}&\frac{1}{2}\\\frac{1}{2}&-\frac{1}{2}&\frac{1}{2}&-\frac{1}{2}\end{bmatrix}}_{\text{Port-to-beam precoding 3-1}}\underbrace{\begin{bmatrix}\frac{1}{2}&\frac{1}{2}&\frac{1}{2}&\frac{1}{2}\\\frac{1}{2}&\frac{1}{2}&-\frac{1}{2}&-\frac{1}{2}\\\frac{1}{2}&-\frac{1}{2}&-\frac{1}{2}&\frac{1}{2}\\\frac{1}{2}&-\frac{1}{2}&\frac{1}{2}&-\frac{1}{2}\end{bmatrix}}_{\text{Layer-to-port precoding 1-3}}\begin{bmatrix}L_0\\L_1\\L_2\\L_3\end{bmatrix}=$$

$$\begin{bmatrix}1&0&0&0\\0&1&0&0\\0&0&1&0\\0&0&0&1\end{bmatrix}\begin{bmatrix}L_0\\L_1\\L_2\\L_3\end{bmatrix}=\begin{bmatrix}L_0\\L_1\\L_2\\L_3\end{bmatrix}$$

Finally, any four orthogonal vectors satisfying the two key properties of the port-to-beam precoding in Section 5.3 can be chosen from the 4T codebook in FIG. 2. Another such example is given below:

$$\begin{bmatrix}\frac{1}{2}&\frac{-1}{2}&\frac{-1}{2}&\frac{-1}{2}\\\frac{1}{2}&\frac{1}{2}&\frac{-1}{2}&\frac{1}{2}\\\frac{1}{2}&\frac{-1}{2}&\frac{1}{2}&\frac{1}{2}\\\frac{1}{2}&\frac{1}{2}&\frac{1}{2}&\frac{-1}{2}\end{bmatrix}$$

Property 1 is easily verified for the above precoding.
Property 2 holds since one can quickly verify that the column vectors of the above matrix are mutually orthogonal.

Flexibility of Implementation

An apparatus is provided for flexible implementation of the port-to-beam matrix operation. The port-to-beam mapping can be implemented flexibly as a separate module 3-1 in the RRH or can be equivalently implemented in the analog domain by setting the transmit beam coefficients 3-4 to mimic the same matrix operation in 3-1. That is, it performs operations in the analog domain which undo the precoding that was performed on the signal received from the BBU. Those operations also force the UEs to feed back the specific PMIs as discussed in earlier sections with reference to the port-to-beam, precoding module 3-1. The principle is illustrated below.

In FIG. 7, $UE_0$ in beam $B_0$ is designed to receive the following linear combination of antenna port signals: $P_0(0)AP_0+P_0(1)AP_1+ \ldots +P_0(M-1)AP_{M-1}$. Simultaneously, the others UEs indexed by $UE_k$ in beam $B_k$ (k=0 to K-1) are designed to receive the following linear combination of AP signals: $P_k(0)AP_0+P_k(1)AP_1+ \ldots +P_k(M-1)AP_{M-1}$. Each linear combination coefficient $P_k(i)$ is typically a complex number from the M×1 precoding vector $P_k$; the magnitude component of $P_k(i)$ represents a scaling (multiplication) of the AP signal, while the phase component of $P_k(i)$ represents a phase-shift of the AP signal. The specific numbers depend on the choice of the precoding vectors. For the example chosen in FIG. 8, the numbers are real numbers though one can also think of a real number as a complex number whose phase is a multiple of 180 degrees/'pi' radians. So far in this document, these linear combinations were assumed to have been implemented as a matrix multiplication in the module 3-1. However, for several practical reasons, it may be advantageous to implement the same matrix operation in the analog domain by setting the beam coefficients appropriate.

A method of setting the transmit beam coefficients to achieve such effect is described below.

The module 3-1 is set as the identity mapping: K=M, $TX_0 = AP_0, \ldots, TX_{M-1} = AP_{M-1}$ and instead the matrix operation is now implemented in the TXRU to physical antenna mapper 3-2 shown in FIG. 6. Let $d^{(k)}$ denote the vector of beam coefficients that corresponds to the set of coefficients forming the beam $B_k$, where the vector notation is defined as follows: $d^{(k)} \triangleq [d_1^{(k)} \ d_2^{(k)} \ \ldots \ d_R^{(k)}]^T$, with $a^T$ representing the transpose of the vector a. Then the transmit beam coefficients 3-4 see FIG. 6) are set as follows:

$$w^{(0)} = P_0(0)d^{(0)} + P_1(0)d^{(1)} + \ldots + P_{M-1}(0)d^{(M-1)} \quad \text{(EQU. 1)}$$

$$w^{(1)} = P_0(1)d^{(0)} + P_1(1)d^{(1)} + \ldots + P_{M-1}(1)d^{(M-1)} \quad \text{(EQU. 2)}$$

$$\vdots$$

$$w^{(M-1)} = P_0(M-1)d^{(0)} + P_1(M-1)d^{(1)} + \ldots + P_{M-1}(M-1)d^{(M-1)}. \quad \text{(EQU. 3)}$$

Note that the $UE_k$ in beam $B_k$ receives the signals shaped by the beam coefficient vector $d^{(k)}$, which as desired evaluates to: $P_k(1)AP_1+ \ldots +P_k(M-1)AP_{M-1}$. In EQU. 1 through EQU. 3 above, note that in an AAS implementation, the resultant beam coefficients may be quantized to finite precision, or they may be properly scaled (i.e., all beam coefficients multiplied by a common factor) to achieve the desired dynamic range.

From these equations, it will be apparent that the weights that are applied by the module identified by $W_i^{(k)}$ are as follows:

$$W_i^{(k)} = P_0(k)d_i^{(0)} + P_1(k)d_i^{(1)} + \ldots + P_{M-1}(k)d_i^{(M-1)}$$

This summation is pre-calculated and typically yields a complex number. This complex number is multiplied with the incoming signal as a beamforming weight using adjustable gain and phase adjusters.

In the above description, the number of target beams was general (equal to K=M). A specific example application of EQU. 1 to EQU, 3 would be the 2T system in FIG. 8. The matrix multiplication operation of module 3-1 can be alternatively and equivalently implemented in module 3-2 as given below:

The port-to-beam mapping in 3-1 is set to the 2×2 identity matrix implying that AP is directly mapped to $TX_0$ and $AP_1$ is directly mapped to $TX_1$. The matrix operation $$\begin{bmatrix} \frac{1}{\sqrt{2}} & \frac{1}{\sqrt{2}} \\ \frac{1}{\sqrt{2}} & \frac{-1}{\sqrt{2}} \end{bmatrix}$$

on the antenna ports is equivalently realized by setting the transmit beam coefficients 3-4 as:

$$w^{(0)} = \frac{1}{\sqrt{2}}d^{(0)} + \frac{1}{\sqrt{2}}d^{(1)}$$

$$w^{(1)} = \frac{1}{\sqrt{2}}d^{(0)} + \frac{1}{\sqrt{2}}d^{(1)}$$

where $d^{(0)}, d^{(1)}$ are the target beam coefficient vectors chosen for beams $B_0$ and $B_1$ depending on the directions in which $UE_0$ and $UE_1$ are located and also their respective propagation channel conditions.

Port to Spatial Direction Mapping

Figure 10:
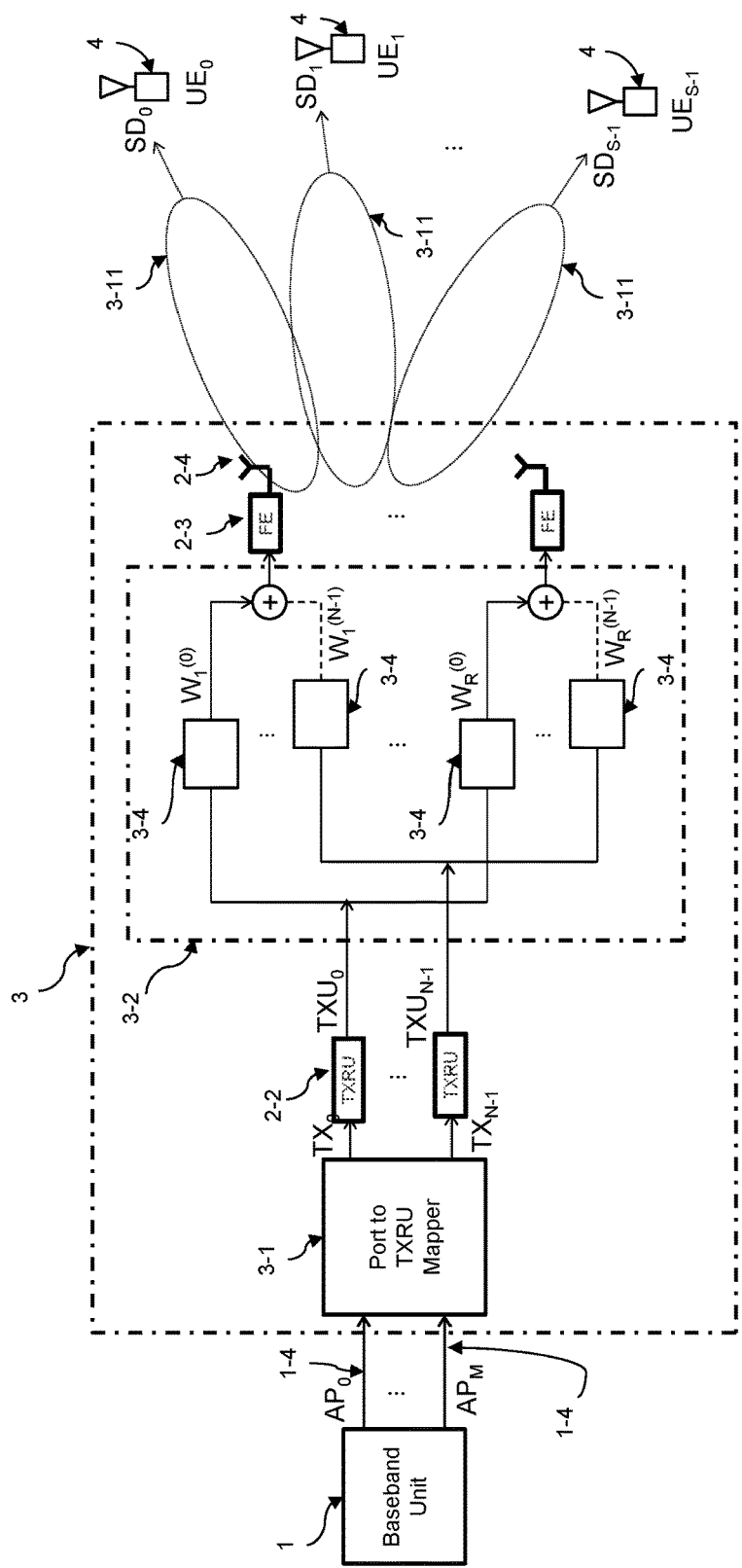
FIG. 10 shows the AAS operation, where transmit beam coefficients are designed and applied such that a user equipment (UE) at a spatial direction (SD) receives a desired linear combination of the signals from the antenna ports (APs) of a baseband unit (BBU).

So far, it was assumed that the number of data layers=number of UEs=K is less than or equal to the number of antenna ports (M). In addition, it was assumed that the number of TXRUs N is equal to the number of layers K and each TXRU is responsible for producing one beam serving one UE each. However, each beam is capable of having many different sub-beams pointing in a number of spatial directions (SD) much more than the number of TXRUs. Let S denote the number of such spatial directions. This number S may be much larger than M and N and is limited only by the aperture of the array but not by the number of antenna ports or TXRUs. In this case, the port-to-beam operation from the K<=M case can be generalized to a port-to-spatial-direction mapping where the antenna port signals are now mapped directly to individual spatial directions (SD) of the sub-beams. This mapping is general in the number of SDs and linear combinations that can be targeted. In practice, the number of linear combinations at different SDs that can be targeted is only limited by the geometry of the antenna array in the AAS, but it is independent of the number of antenna ports M, and the number of TXRUs N. An antenna array with a larger aperture can produce narrow sub-beams, and as a result can target larger number of linear combinations for different SDs with minimal overlapping of the sub-beams. Note that the sub-beams/spatial directions 3-11 in FIG. 10 is different from beams 3-10 in all the previous figures and sections of this patent document. A single TXRU is responsible for generating the beam $B_k$ hut such a beam can comprise of multiple sub-beams by setting the beam coefficients to be a linear combination of the coefficients corresponding to the SDs of the sub-beams. Thus, the number of sub-beams/spatial directions S is much larger than the number of TXRUs N in FIG. 10. A method for mapping antenna ports to different spatial directions is described below which extends the port-to-beam mapper discussed in the previous sections.

FIG. 10 illustrates the downlink (transmit) of the system with M antenna ports, N TXRUs and S spatial directions 3-11. The number of UEs K is now equal to the number of spatial directions S. The UEs indexed by $UE_k$ in spatial direction $SD_k$ (k=0 to K−1, K=S>M) are designed to receive the following linear combination of AP signals: $P_k(0)AP_0 + P_k(1)AP_1 + \ldots + P_k(M-1)AP_{M-1}$. The module 3-1 is set as the identity mapping: N=M, $TXRU_0=AP_0, \ldots, TXRU_{M-1}=AP_{M-1}$. Let $s^{(k)}$ denote the vector of beam coefficients that corresponds to the spatial direction $SD_k$. Then the transmit beam coefficients 3-4 in the TXRU-to-antenna element mapping 3-2 are set as follows:

$$w^{(0)} = P_0(0)s^{(0)} + P_1(0)s^1 + \ldots + P_{M-1}(0)s^{(K-1)} \quad (EQU.\ 4)$$

$$w^{(1)} = P_0(1)s^{(0)} + P_1(1)s^1 + \ldots + P_{M-1}(1)s^{(K-1)} \quad (EQU.\ 5)$$

$$w^{(M-1)} = P_0(M-1)s^{(0)} + P_1(M-1)s^{(1)} + \ldots + P_{M-1}(M-1)s^{(K-1)}. \quad (EQU.\ 6)$$

A specific example application of EQU. 4 to EQU. 6 would be a 2T (M=2) with 4 spatial directions SDs (K=4). The port to TXRU mapping in 3-1 is set to the 2×2 identity matrix implying that $AP_0$ is directly mapped to $TXRU_0$ and $AP_1$ is directly mapped to $TXRU_1$. Given four possible linear combinations in the 2T codebook $S_1$, the BBU can use all the four linear combinations by setting the weights/coefficients 3-4 as:

$$w^{(0)} = \frac{1}{\sqrt{2}}s^{(1)} + \frac{1}{\sqrt{2}}s^{(2)} + \frac{1}{\sqrt{2}}s^{(3)} + \frac{1}{\sqrt{2}}s^{(4)}$$

$$w^{(1)} = \frac{1}{\sqrt{2}}s^{(1)} - \frac{1}{\sqrt{2}}s^{(2)} + \frac{j}{\sqrt{2}}s^{(3)} - \frac{j}{\sqrt{2}}s^{(4)}$$

The above mapping targets four linear combinations for the four UEs in four different SDs using only two antenna ports, i.e, $UE_0$ receives the linear combination $$\frac{AP0 + AP1}{\sqrt{2}},$$

$UE_1$ receives $$\frac{AP0 - AP1}{\sqrt{2}},$$

$UE_2$ receives $$\frac{AP0 + jAP1}{\sqrt{2}}$$

and $UE_3$ receives $$\frac{AP0 - jAP1}{\sqrt{2}}.$$

Note that although S UEs in S sub-beams can feed back M-dimensional PMIs with the port to spatial direction mapping, since S>M, these S PMIs can never be mutually orthogonal to each other (one can only have upto 'M' mutually orthogonal M-dimensional vectors). Therefore, this mapping does not satisfy one of the design principles laid out in Section 5.3, i.e., the port-to-spatial direction mapping implemented in the analog module 3-2 will not cancel the effect of the BBU precoder 1-3 resulting in interference between the data layers thereby not achieving spatial multiplexing to the 'S' UEs. In other words, the spatial multiplexing gain (the number of UEs that can be scheduled for simultaneous MU-MIMO transmission) is bottlenecked by the smallest of the 1) no. of antenna ports 2) no. of TXRUs and 3) no. of orthogonal spatial directions, i.e., Spatial multiplexing gain (K)=min {M, N, S}.

For instance, in the above example of M=2 and S=4, the spatial multiplexing gain/the number of UEs that can be simultaneously scheduled for MU-MIMO operation is K=min {2,2,4} which implies that the BBU will have to schedule a user pair in $SD_0$, $SD_1$ for MU-MIMO transmission in one time-frequency slot and another user pair in $SD_2$, $SD_3$ for MU-MIMO transmission in another time-frequency slot.

Note that FIG. 6 conceptually illustrates the beamforming circuitry for implementing the beamforming weights as a module that sits between the TXRUs 2-2 and the FEs 2-3. In fact, the beamforming circuitry, which includes adjustable phase elements and adjustable gain elements, can be anywhere along the signal path between where the signal has been converted to analog and the antenna. For example, it can be implemented at IF or at RF. It can be a separate module, or the beamforming elements can be within and a part of other circuit modules, such as for example within the FEs 2-3. A specific example of one embodiment of such circuitry is illustrated by FIGS. 11 and 12.

Figure 11:
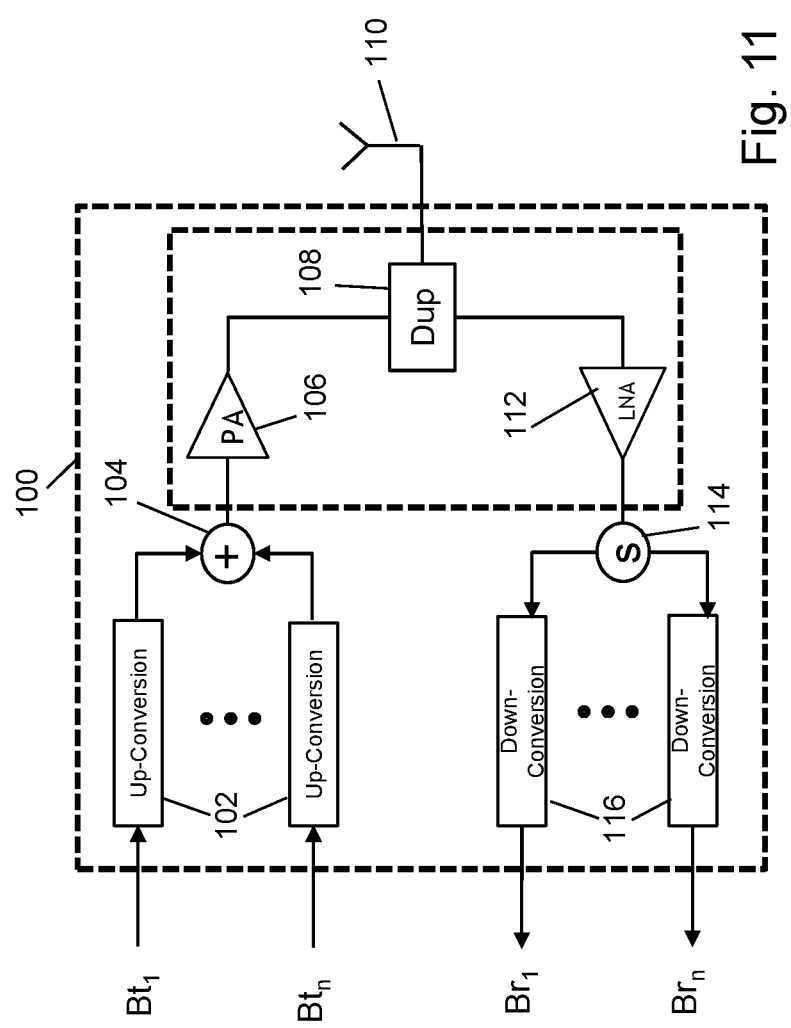
FIG. 11 is a block diagram of a front-end module connected to one antenna element of an antenna array.

FIG. 11 shows a block diagram of the circuitry that connects to a single antenna element 110 of the multi-element antenna array. In the antenna array system has R antenna elements, this circuitry is duplicated for each antenna element. For each antenna element 110, there is a front-end module 100 connected to the antenna element 110. The front-end module has a transmitter side and a receiver side. The transmitter side includes N up-conversion modules 102, a combiner circuit 104, and a power amplifier (PA) 106. The receiver side includes a low noise amplifier (LNA) 112, a splitter 114, and N down-conversion modules 116. The front-end module 100 also includes a duplexer circuit 108 that couples the drive signal from the PA 106 on the transmitter side to the antenna element 110 and couples a received signal from the antenna element 110 to the LNA 112 on the receiver side. The input of each up-conversion module 102 is for receiving a afferent beam transmit signal stream $Bt_1 \ldots Bt_n$ from the TXRUs (not shown). And the output of each down-conversion module 116 is for outputting a different beam received signal stream $Br_1 \ldots Br_n$. As noted above, each beam transmit signal stream is mapped to a different beam that is generated by the active antenna array system and each received signal stream corresponds to the signal received by a different receive beam formed by the active antenna array.

Figure 12:
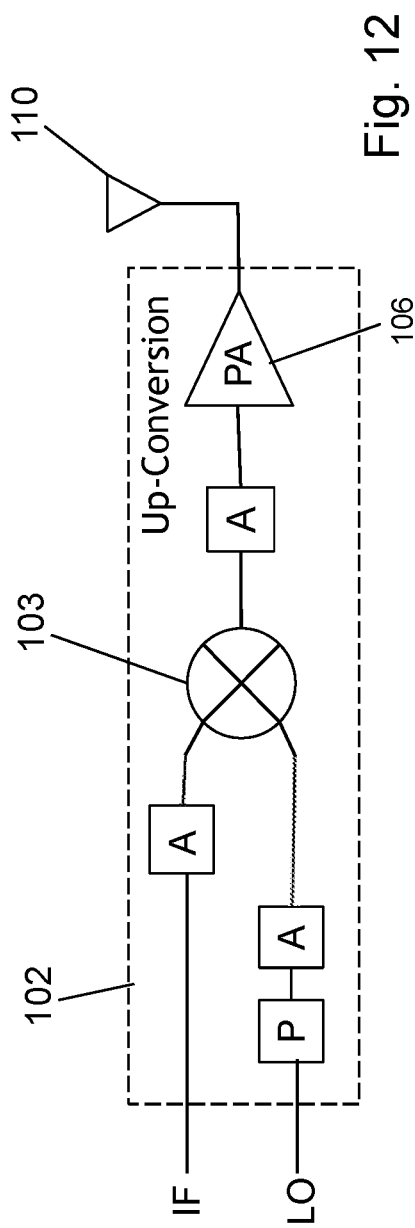
FIG. 12 is a block diagram showing the more relevant components within the up-conversion modules shown in FIG. 11.

FIG. 12 shows an up-conversion module 102 of FIG. 11 in greater detail. In this figure, which only shows a single up-conversion module connected to its corresponding antenna element, the combiner and duplexer are omitted. Each up-conversion module 102 includes a mixer 103 and various amplitude and phase setting circuits identified by A and P, respectively. The LO (local oscillator) signal and the distributed IF transmit signal stream are both provided to the mixer 103 which up-converts the IF transmit signal stream to an RF transmit signal stream that is provided to the power amplifier 106. The amplitude and phase setting circuits A and P are the circuits which apply the beamforming weights; they are used for changing the relative phase or amplitude of individual antenna signals to thereby establish the size, direction, and intensity of the transmit and receive beam patterns that are generated by the antenna array, and as described above they can also be used to simultaneously perform matrix operations on the signal streams to generate linear combinations of those signal streams.

The above examples illustrate using LTE preceding vectors as the linear combinations of AP signals in the transmission and reception, and users with orthogonal precoding vectors are scheduled simultaneously by the BBU. In the general case, the linear combination coefficients may be arbitrary parameters, the targeted spatial directions maybe non-orthogonal, and the BBU may schedule any combinations of users based on, for example, throughput, user demands, path loss, network interference, scheduling fairness, and any other parameters.

It is understood that the above descriptions are only illustrative of the underlying principles. Various alterations, improvements, and modifications will occur and are intended to be suggested hereby and are within the spirit and scope of the following claims. The principles described herein can, however, be embodied in many different forms and should not be construed as limited to the embodiments set forth herein. Rather, these embodiments are provided so that the disclosure will be thorough and complete and will fully convey the scope of the underlying principles to those skilled in the arts. It is understood that the various embodiments, although different, are not mutually exclusive. While the embodiments of the antenna-port-to-spatial-direction method and apparatus has been described by targeting two antenna ports and two, three, or four spatial directions, those of skill in the art will recognize that the present disclosure can be used to target any plurality of antenna ports and linear combinations at different spatial directions using the same described principles, if desired. Furthermore, a computer-readable medium can be encoded with a computer program, so that execution of that program by one or more processors to perform one or more of the methods of magnitude and phase adjustment. In accordance with these principles, those skilled in the art can devise numerous modifications without departing from the spirit and scope of the invention. A "computer" can comprise a single machine or processor or can comprise multiple interacting machines or processors (located at a single location or at multiple locations remote from one another).

What is claimed is:

1. A method for communicating with a plurality of communication devices (UEs) using a phased array antenna system including an array of antenna elements, said method comprising:
receiving a plurality of port signal streams, wherein the plurality of port signal streams was obtained by precoding a plurality of data streams, each data stream of the plurality of data streams intended for a different corresponding UE among the plurality of UEs; and
within the phased array antenna system, processing the plurality of port signal streams to (1) undo the preceding that was performed on the plurality of data streams, and (2) generate via the array of antenna elements a plurality of transmit beams, wherein each transmit beam is directed towards a corresponding different UE among the plurality of UEs and carries a corresponding transmit signal that is derived exclusively from the data stream among the plurality of data streams that is intended for that UE.

2. The method of claim 1, wherein precoding involves applying a layer-to-port preceding matrix to the plurality of data streams to yield the plurality of port signal streams among which each port signal stream is a linear combination of the plurality of data streams.

3. The method of claim 2, wherein processing the plurality of port signal streams effectively applies a port-to-beam precoding matrix to the plurality of port signal streams, wherein the port-to-beam matrix and the layer-to-port matrix when multiplied together generates a diagonal matrix.

4. The method of claim 3, wherein the diagonal matrix is an identity matrix.

5. The method of claim 3, wherein the port-to-beam precoding matrix is applied to the plurality of port signal streams in a digital domain.

6. The method of claim 3, wherein the port-to-beam preceding matrix is applied to the plurality of port signal streams in an analog domain.

7. The method of claim 6, wherein processing involves applying beamforming weights to the phased array antenna system to generate the plurality of transmit beams.

8. The method of claim 2, wherein processing involves converting the plurality of port signal streams from digital to analog to generate a plurality of analog signal streams; and in the analog domain applying beamforming weights to the phased array antenna system to generate the plurality of transmit beams.

9. The method of claim 8, wherein the beamforming weights also cause the phased array antenna system to undo the precoding that was performed on the plurality of data streams.

10. The method of claim 9, wherein the beamforming weights cause the phased array antenna system to effectively apply a port-to-beam precoding matrix to the plurality of analog signal streams, wherein the port-to-beam matrix and the layer-to-port matrix when multiplied together generates a diagonal matrix.

11. The method of claim 3, wherein the port-to-beam precoding matrix is constructed from N precoding vectors that are mutually orthogonal, and wherein N is an integer equal to the number of data streams within the plurality of data streams.

12. The method of claim 11, wherein the N precoding vectors are selected from a MU-MIMO codebook.

13. The method of claim 3, wherein the layer-to-port precoding matrix is a non-diagonal matrix, the port-to-beam precoding matrix is a non-diagonal matrix, and the product of the layer-to-port precoding matrix and the port-to-beam precoding matrix is a diagonal matrix.

* * * * *